(12) United States Patent
Tsuboi

(10) Patent No.: US 7,854,520 B2
(45) Date of Patent: Dec. 21, 2010

(54) PROJECTOR DEVICE

(75) Inventor: Tomoaki Tsuboi, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 816 days.

(21) Appl. No.: 11/827,037

(22) Filed: Jul. 10, 2007

(65) Prior Publication Data
US 2008/0013056 A1 Jan. 17, 2008

(30) Foreign Application Priority Data
Jul. 11, 2006 (JP) .............................. 2006-190699

(51) Int. Cl.
G03B 21/14 (2006.01)
G03B 21/22 (2006.01)
A47B 81/00 (2006.01)

(52) U.S. Cl. .................................... 353/119; 312/10.1

(58) Field of Classification Search ................. 353/119, 353/122; 70/58, 162, 164, 169, 173; 312/223.1, 312/223.2, 10.1; 361/679.57, 579.58, 726
See application file for complete search history.

(56) References Cited

U.S. PATENT DOCUMENTS 5,987,937 A * 11/1999 Lee ............................... 70/14
5,999,416 A * 12/1999 McAnally et al. ............ 361/816
7,152,440 B1 * 12/2006 Austin ............................ 70/58
2006/0150692 A1 * 7/2006 Chang et al. ................... 70/58

FOREIGN PATENT DOCUMENTS

JP 2005-347437 12/2005

* cited by examiner

*Primary Examiner*—Georgia Y Epps
*Assistant Examiner*—Ryan Howard
(74) *Attorney, Agent, or Firm*—Yokoi & Co., U.S.A. Inc.; Toshiyuki Yokoi

(57) ABSTRACT

The present invention discloses a projector device comprising: a housing body having a first insertion slot formed in a wall portion thereof; a control substrate; a metal-made shield frame arranged and fixed within the housing body and fixed to the housing body for allowing the control substrate; a reinforcing bracket for reinforcing the first insertion slot; the reinforcing bracket including a reinforcing surface and an extension surface extending to be perpendicular to the reinforcing surface; the reinforcing surface having a second insertion slot; a positioning section provided on an inner surface of the wall portion of the housing body for causing the reinforcing bracket to be positioned with respect to the housing body with the second insertion slot of the reinforcing bracket being aligned with the first insertion slot; and a screw for causing the extension surface positioned by the positioning section to be coupled to the shield frame.

3 Claims, 8 Drawing Sheets

PROJECTOR DEVICE

CROSS-REFERENCES TO RELATED APPLICATIONS

The present application is related to the Japanese Patent Application No. 2006-190699, filed Jul. 11, 2006, the entire disclosure of which is expressly incorporated by reference herein.

BACKGROUND OF THE INVENTION (1) Field of the Invention

The present invention relates to a projector device and, more particularly, to a projector device employing an auxiliary fitting or a lock mechanism for theft prevention.

(2) Description of Related Art

At present, such a lock mechanism as will be discussed hereinafter has been known as a theft prevention measure for a relatively portable, household electric appliance, such as a projector device, a note type personal computer and the like. Referring now to FIG. 7, there is illustrated a projector device 2 which is adapted to be locked by a lock mechanism 100. The lock mechanism 100 is called a kensington lock and serves as means to couple the projector device 2 to a stationary article such as a desk and the like, or another projector device, to thereby prevent the projector device 2 from being stolen. The lock mechanism 100 comprises a lock shaft 1a which is to be inserted through a laterally extending insertion slot 2a formed in an I/O case of a housing body of the projector device 2, and then engaged with the projector device 2, a body 1c supporting the lock shaft 1a and having a key hole formed therein, the body 1c being adapted to be operatively engaged with a separate key section 1b and then perform a locking operation, and a wire 1d connected at one end thereof to the body 1c and adapted to be coupled at the other end to the stationary article. The lock shaft 1a has a pair of projecting pieces 1a1 projecting radially from a tip end of the lock shaft 1a. After the lock shaft 1a of the lock mechanism 100 is inserted through the insertion slot 2a of the projector device 2, the key section 1b is operatively engaged with the key hole of the body 1c and then rotated through substantially 90 degrees. By this, the lock shaft 1a having the projecting pieces 1a1 is also rotated through substantially 90 degrees in an interior of the projector device 2. At this time, postures of the projecting pieces 1a1 of the lock shaft 1a become vertical relative to the laterally extending insertion slot 2a of the projector device 2, whereby the projecting pieces 1a1 are engaged with an inner surface of a wall of the projector device 2. Thus, the lock mechanism 100 is coupled to the projector device 2.

The above-mentioned lock mechanism is utilized for theft prevention purpose, so that a surface of the projector device 2 which surrounds the insertion slot 2a is required to have mechanical strength which is enough to prevent the lock mechanism 100 from being disengaged from the projector device, even if the lock mechanism 100 is pulled out or is pushed in with strong force, whereby the wall of the projector device 2 is broken. For this reason, the mechanical strength of the surface around the insertion slot 2a of the projector device 2 is added by a reinforcing bracket 3 which is shown in FIG. 8 and is to be mounted to a bracket fixing-section 2b1 (FIG. 8) provided on the I/O case of the projector device. Referring now to FIG. 8, the reinforcing bracket 3 comprises a reinforcing plate 3b for reinforcing the insertion slot 2a of the projector device, the reinforcing plate 3b having an insertion slot 3a substantially similar to the insertion slot 2a of the projector device 2, and a horizontal plate portion 3c so as to be substantially perpendicular to the reinforcing plate 3b. The mounting of the reinforcing bracket 3 to the bracket-fixing section is carried out in such a manner that the insertion slot of the reinforcing bracket 3 is aligned with the insertion slot 2a of the I/O case of the projector device 100. The lock shaft 1a of the lock mechanism 100 is inserted through the insertion slot 3a of the reinforcing bracket 3 and the insertion slot 2a of the projector device 2, and operatively engaged with the inner surface of the wall of the projector device 2 in the same manner as described above. By this, even if the lock mechanism 100 is pulled out and/or pushed in from outside the projector device 2, the reinforcing plate 3b can resist a pulling force and/or a pushing force which is applied to the projecting pieces 1a1 of the lock shaft 1a, so that breakage of the projector device 2 can be prevented. As discussed above, the I/O case of the projector device 2 has the bracket-fixing section 2b1 provided thereon for allowing the reinforcing bracket 3 to be fixed at a predetermined location.

FIG. 8 is a schematic perspective view of the bracket-fixing section 2b1 which is formed on the I/O case (not shown). The bracket-fixing section 2b1 comprises a pair of spaced apart guide portions 2b2, 2b3 for supporting both sides of the horizontal plate portion 3c of the reinforcing bracket 3, the guide portions 2b2, 2b3 being provided on the I/O case so as to stand up from the I/O case, and a boss 2b4 arranged between the guide portions 2b2, 2b3 so as to stand up from the I/O case and extending parallel to the general surface of the horizontal plate portion 3c of the reinforcing bracket 3 to be fixed to the bracket-fixing section 2b1. The guide portions 2b2, 2b3 have slits aligned with each other. A washer faced screw 5 is to be fastened to the boss 2b4. The fixing of the reinforcing bracket 3 to the bracket-fixing section 2b1 constructed as discussed above is carried out by first causing the horizontal plate portion 3c of the reinforcing bracket 3 to be inserted into the guide portions 2b2, 2b3 through the slits of the guide sections 2b2, 2b3 while causing the reinforcing plate 3b to be received in a space between the spaced apart guide portions 2b2, 2b3, whereby the reinforcing bracket 3 is positioned on the left and right sides. Then, the screw 5 is fastened into the boss 2b4, whereby vertical movement of the reinforcing bracket 3 is restricted by a region under a neck of the screw 5. In this way, the reinforcing bracket 3 is fixed to the bracket-fixing section 2b1 of the I/O case so as to be prevented from be laterally and vertically moved.

When the screw 5 is fastened into the boss 2b4 of the bracket-fixing section 2b1, the fastening of the screw 5 to the boss 2b4 of the bracket-fixing section 2b1 is required to be controlled at a predetermined torque. Generally, torque which will be produced in order to fasten the screw into the boss 2b4 is a torque of between 8 kN and 10 kN. Therefore, when a worker fastens the screw 5 into the boss 2b4, the worker performs a suitable torque control by utilizing a torque wrench. "The torque of the screw 5" is given to mean a torque which is produced when the screw 5 is fastened into the boss 2b4 until a region of the screw 5 which occupies a region under a head of the screw (a region under the neck of the screw) is abutted against an internally threaded peripheral portion of the boss 2b4. In this case, the I/O case is required to have a strength enough to resist the torque of the screw 5. The I/O case which is currently employed is made of resin and designed such that it has a thickness enough to withstand the torque.

However, it is desirable that the torque of the screw 5 for fixing the reinforcing bracket 3 to the bracket-fixing section 2b1 is more than 8 kN-10 kN, since the lock mechanism 100 is designed so as to be able to withstand the pulling force and/or pushing force which may be applied to the lock mechanism 100, and increase in the torque of the screw for fixing the reinforcing bracket 3 will make it possible to comply with a large pulling force and/or a large pushing force which may be applied to the lock mechanism. In addition, since the housing body of the projector device has an influence upon an impression of a visual appearance of the article, it is desirable that design freedom is provided to the housing body of the projector device. Concretely, it is desirable that there can be gained an increased degree of freedom in designing the article in such a manner that the housing body is made thin, to thereby make the weight of the entire article light and make the article easily to be carried, or in such a manner that cooling efficiency within the housing body is increased by forming a plurality of slits in the housing body. When the entire housing body is made thin, there is a possibility that the I/O case $2b$ will not withstand the fastening torque of the screw 5 and a torque of more than 8 kN-10 kN. Moreover, when the slits are formed in the housing body, the same drawback is presented.

A structure for mounting a top cover, which has been devised from the viewpoint of reduction in the number of components and reduction in assembly man-hours, is disclosed in Japanese Patent Application Laid-Open No. 2005-347437. More particularly, there is disclosed a structure for screw-fastening to a bottom chassis a top cover put on the bottom chassis, in which the top cover has recess surfaces provided on forward portions of left and right side walls thereof, insertion holes formed in the recess surfaces, through which screws are to be inserted, and engaging portions provided at rearward portions of the left and right side walls, the engaging portions being adapted to be engaged with the bottom chassis. Fixing of the top cover to the bottom chassis is carried out by causing the screws to be fastened into the insertion holes of the top cover put on the bottom chassis, and causing the engaging portions of the top cover to be engaged with the bottom chassis. This construction facilitates reduction in the number of screws for fixing the left and right side walls of the top cover to the bottom chassis, and reduction in assembly man-hours.

With the structure disclosed in the above-mentioned Japanese Patent Application Laid-Open No. 2005-347437, it is possible to reduce the number of the screws required to be used, but it is impossible to increase the fastening torque of the screw for fixing the reinforcing bracket in the projector device.

BRIEF SUMMARY OF THE INVENTION

In accordance with one aspect of the present invention, there is provided a projector device which comprises a housing body having a first insertion slot formed in a wall portion thereof, a control substrate, a metal-made shield frame arranged within the housing body and fixed to the housing body for allowing the control substrate to be arranged at a predetermined location in the housing body, a reinforcing bracket for reinforcing the first insertion slot, the reinforcing bracket including a reinforcing surface and an extension surface extending so as to be perpendicular to the reinforcing surface, the reinforcing surface having a second insertion slot, a positioning section provided on an inner surface of the wall portion of the housing body for causing the reinforcing bracket to be positioned with respect to the housing body with the second insertion slot of the reinforcing bracket being aligned with the first insertion slot, and a screw for causing the extension surface of the reinforcing bracket positioned by the positioning section to be coupled to the shield frame, wherein the projector device is adapted to be coupled to a lock mechanism for preventing the projector device from being stolen, the lock mechanism including a lock shaft which is to be inserted through the first and second elongated insertion slots and engaged with the projector device.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and/or utilized.

Projector devices according to embodiments of the present invention will be discussed hereinafter in the following order:

A. First embodiment;
B. Effects obtained by the first embodiment;
C. Second embodiment; and
D. Effects obtained by the second embodiment.

A. First Embodiment

Figure 1:
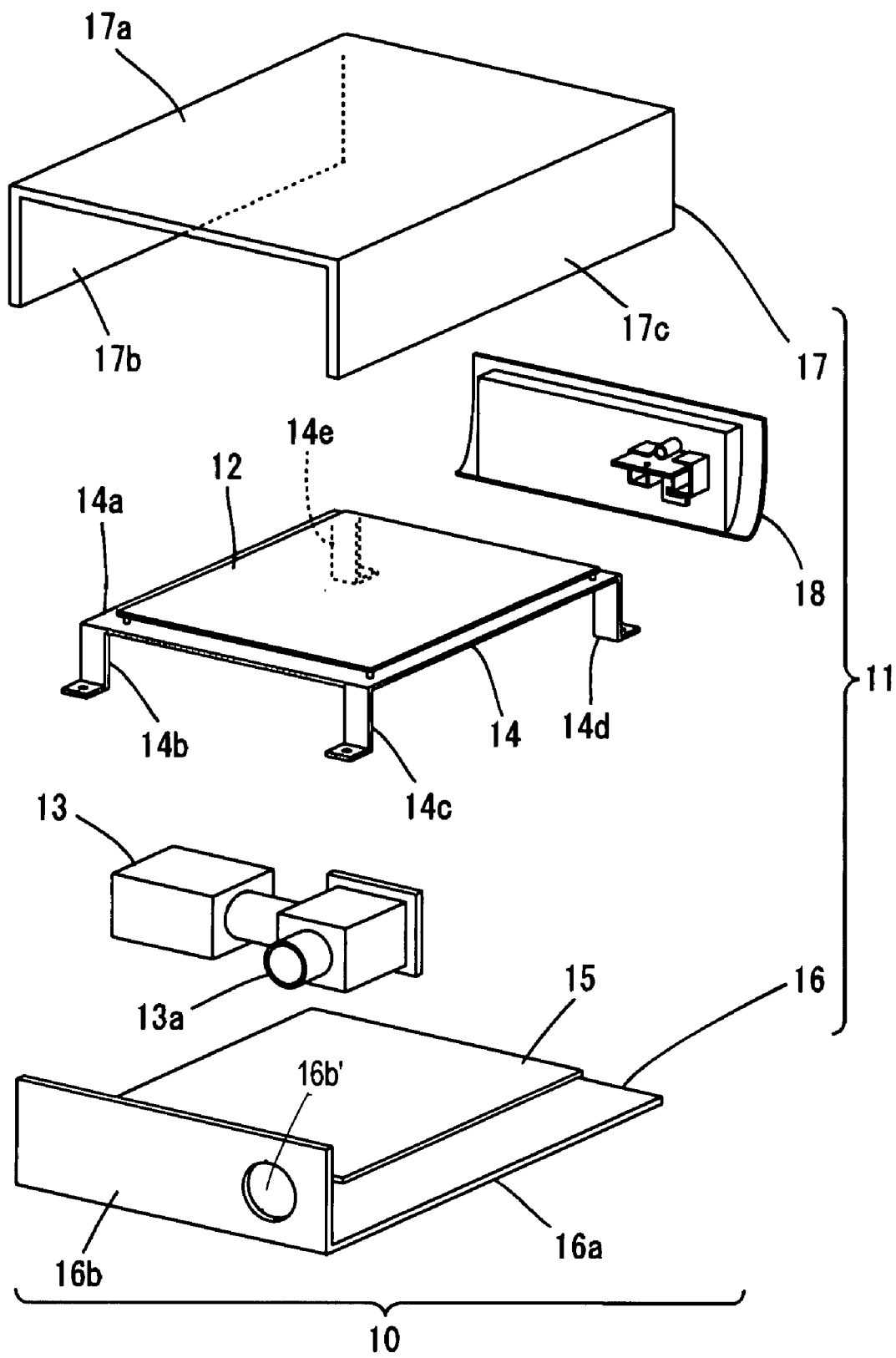
FIG. 1 is a schematic exploded perspective view of a projector device according to the present invention.

A projector device according to the first embodiment of the present invention will be discussed hereinafter with reference to FIGS. 1 to 5. FIG. 1 is a schematic exploded perspective view of the projector device 10. The projector device 10 is adapted to produce an RGB light image from light emitted from a lamp, on the basis of an input signal from eternal equipment, such as a personal computer or the like, project the produced light image into a projector lens, and display an image. The projector device 10 comprises a housing body 11 for housing essential components, a control substrate 12 for receiving an inputted signal and carrying out a predetermined signal processing, an optical system 13 for producing an RGB light image from light emitted from the lamp, on the basis of an signal outputted from the control substrate 12, and projecting an image from the projector lens, a shield frame 14 serving as a ground for the control substrate 12, the shield frame 14 being screw-fastened to the housing body so as to allow the control substrate 12 to be arranged at a predetermined location within the housing body 11, and a power source substrate 15 for supplying power.

The functions of the control substrate 12, the optical system 13, the shield frame 14, and the power source substrate 15 which are housed within the housing body 11 will be discussed hereinafter. Regarding the control substrate 12 and the optical system 13, the functions thereof will be schematically discussed. The image signal inputted from the control substrate 12 is subjected to the predetermined image processing and then outputted to the optical system 13. The optical system 13 is adapted to reflect, via a mirror, light emitted from the lamp arranged inside the optical system, and then output the reflected light to a DMD which is arranged at a back of the projector lens 13a. The DMD comprises a plurality of micromirrors, an inclination of each of which is adapted to be varied according to the image signal from the control substrate 12. Therefore, light inputted to the DMD is reflected at a predetermined angle by the micromirrors and projected into the projector lens 13a. Thus, the incident light is projected from the projector lens 13a, whereby an image is formed on a screen.

Now, the structure of the housing body 11 will be discussed hereinafter. The housing body 11 comprises a top case 17, a bottom case 16, and an I/O case 18. The bottom case 16 is adapted to allow the shield frame 14, having the optical system 13 and the control substrate 12 screw-fastened thereto, and the power source substrate 15 to be arranged at predetermined locations in the housing body 11. In the illustrated example, the bottom case 16 includes a bottom surface 16a for allowing the control substrate 12 and the power source substrate 15 to be arranged on a rearward portion thereof and for allowing the optical system 13 to be arranged on a forward portion thereof The shield frame 14 includes a substrate-arranging surface 14a, from both sides of which four leg portions 14b-14e are extended vertically. The shield frame 14 is fixed to the bottom case 16 with the leg portions 14b-14e straddling the power source substrate 15. Moreover, the bottom case 16 has a front wall 16b provided at a front edge of the forward portion thereof so as to stand up from the bottom case 16. The front wall 16b forms a front side of the housing body 11 and has a through-hole 16b'. The optical system 13 is arranged on the bottom case 16 with an image-projecting side of the projector lens 13a being exposed to the outside through the through-hole 16b'.

The top case 17 is formed into a substantially U-shape in cross-section, and comprises a ceiling surface 17a forming a top surface of the housing body 11, and side walls 17b, 17c extending downward from both edges of the ceiling surface 17a. The top case 17 is screw-fastened to the bottom case 16 in such a manner that the side walls 17b, 17c of the top cover case 17 cover left and right side edges of the bottom case 16. More particularly, the top case 17 is fixed to the bottom case 16 by screws from the side of the bottom case 16 in such a manner that a space defined by the ceiling surface 17a and the both side walls 17n, 17c covers the bottom case 16. Thus, the control substrate 12, the optical system 13, the shield frame 14, and the power source substrate 15 are housed within a space defined by the top case 17 and the bottom case 16.

Figure 7:
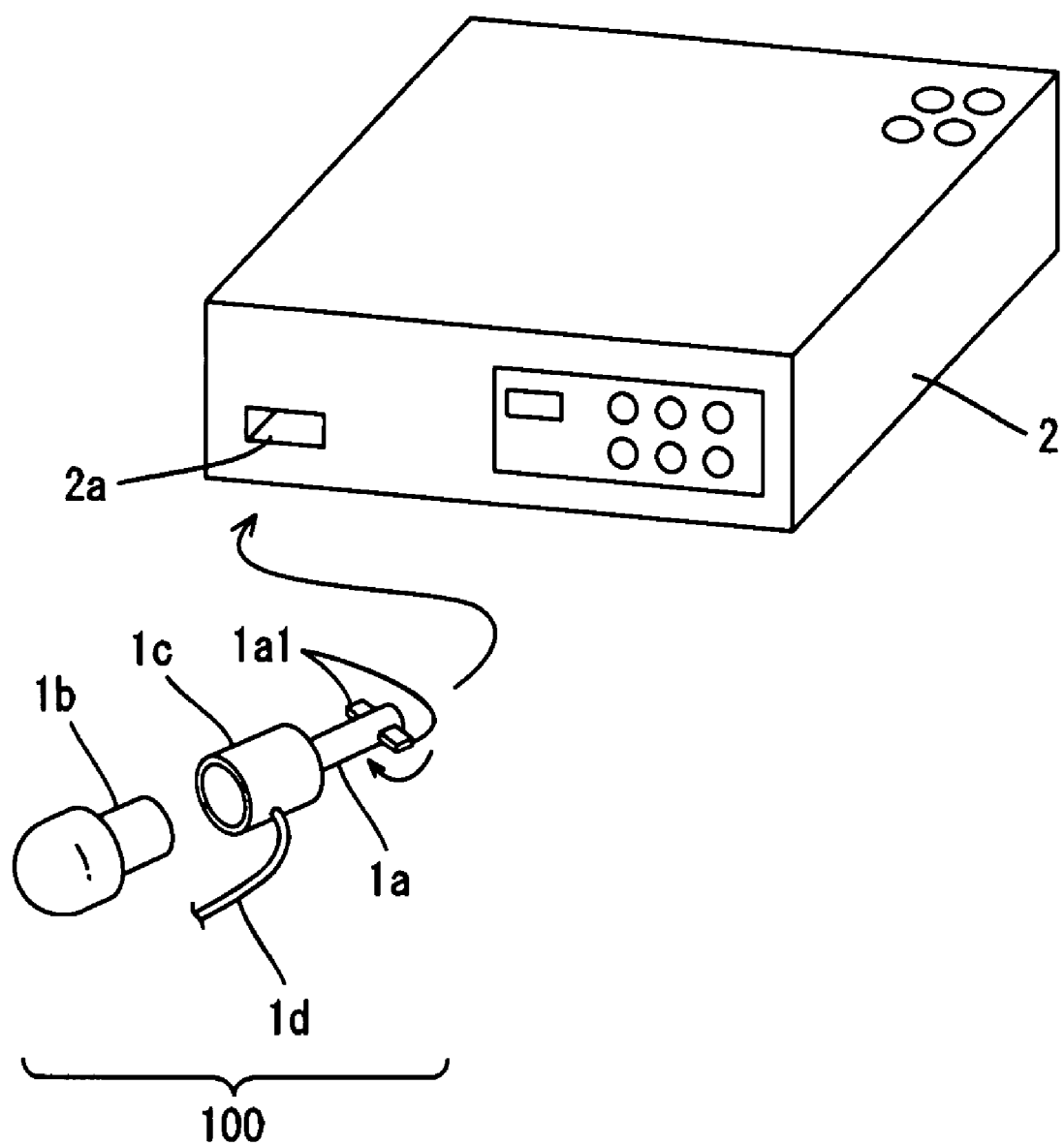
FIG. 7 is a schematic perspective view of a general projector device adapted to be locked by a lock mechanism.
Figure 8:
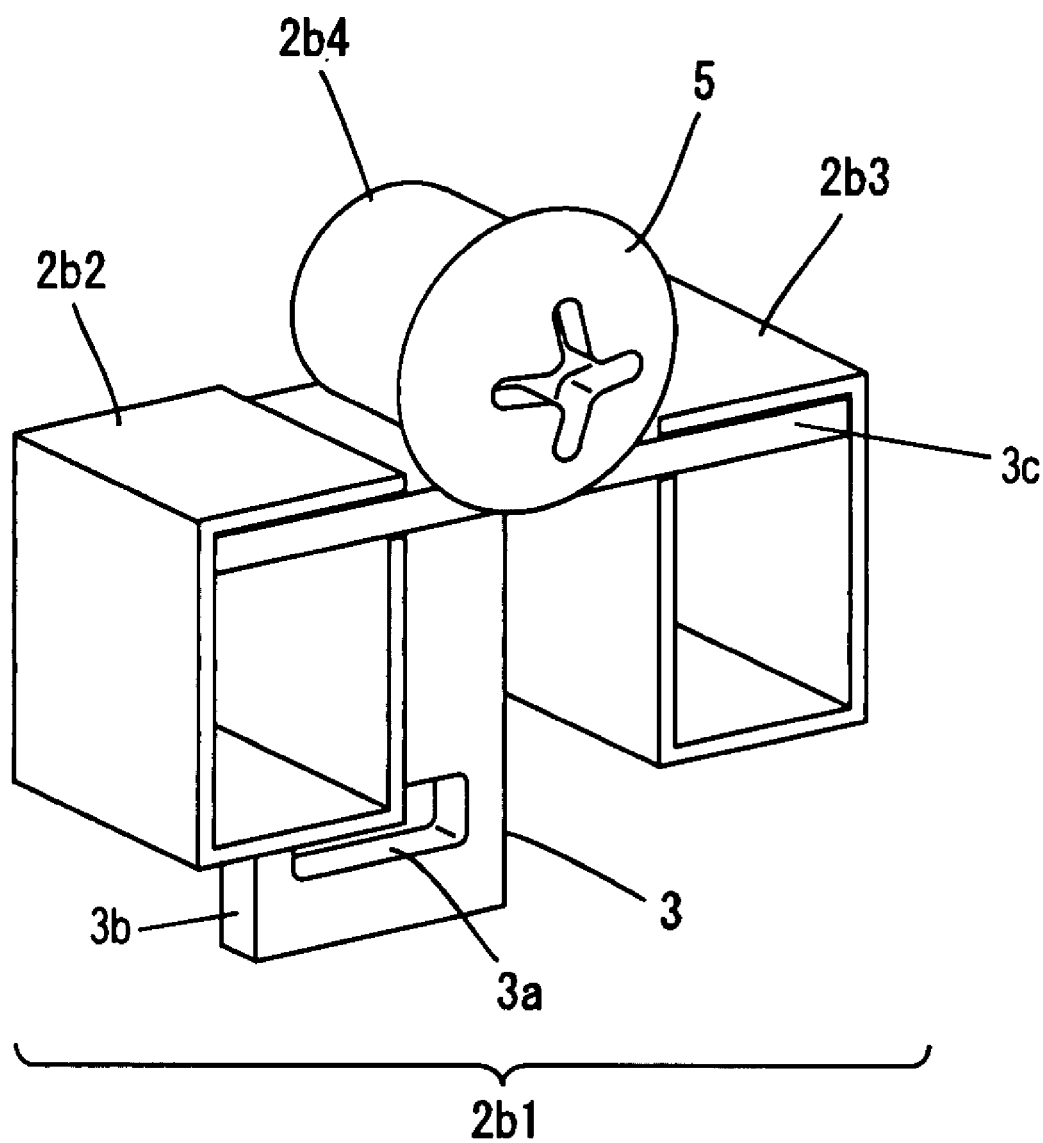
FIG. 8 is a schematic perspective view of a bracket-fixing section of an O/I case employed in the general projector device shown in FIG. 7.

The I/O case 18 includes a substantially rectangle-shaped body in outline which has a circular arc-shape in cross-section. Moreover, the I/O case 18 has a first insertion slot 18a taking the form of a laterally elongated hole (see FIG. 4), through which the lock shaft 1a of the lock mechanism 100 (FIG. 7) is to be inserted and then engaged with the projector device. Through the first insertion slot 18a, the projector device is coupled to the lock mechanism 100. When the top case 17 is screw-fastened to the bottom case 16, the I/O case 18 is fixed to a combination of the top case 17 and the bottom case so as to close an opening opposed to the front wall 16b of the bottom case 16, whereby the I/O case 18 forms a rear side of the housing body 11. In order to facilitate adding of the visual appearance of the projector device 100, the I/O case 18 is formed so as to have a circular arc-shaped in cross-section as discussed above. The I/O case 18 may have slits for cooling the projector device 10.

Figure 2:
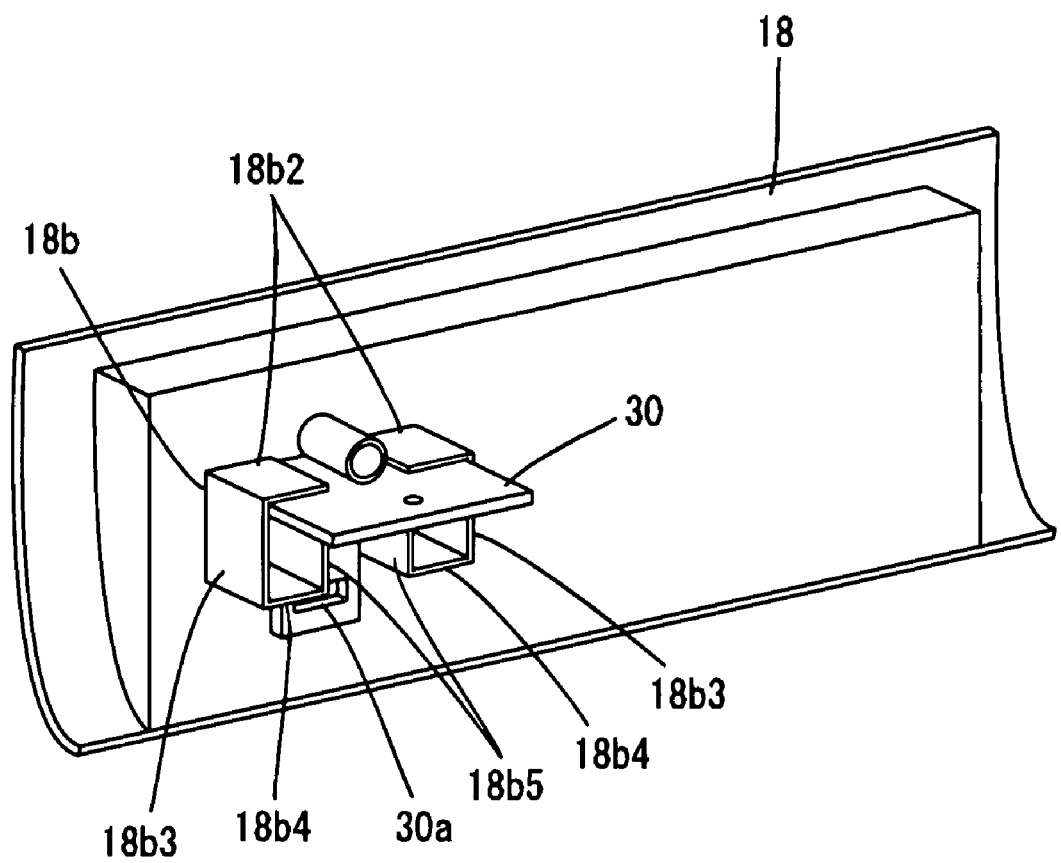
FIG. 2 is a schematic enlarged perspective view of an I/O case employed in the projector device of FIG. 1.
Figure 3:
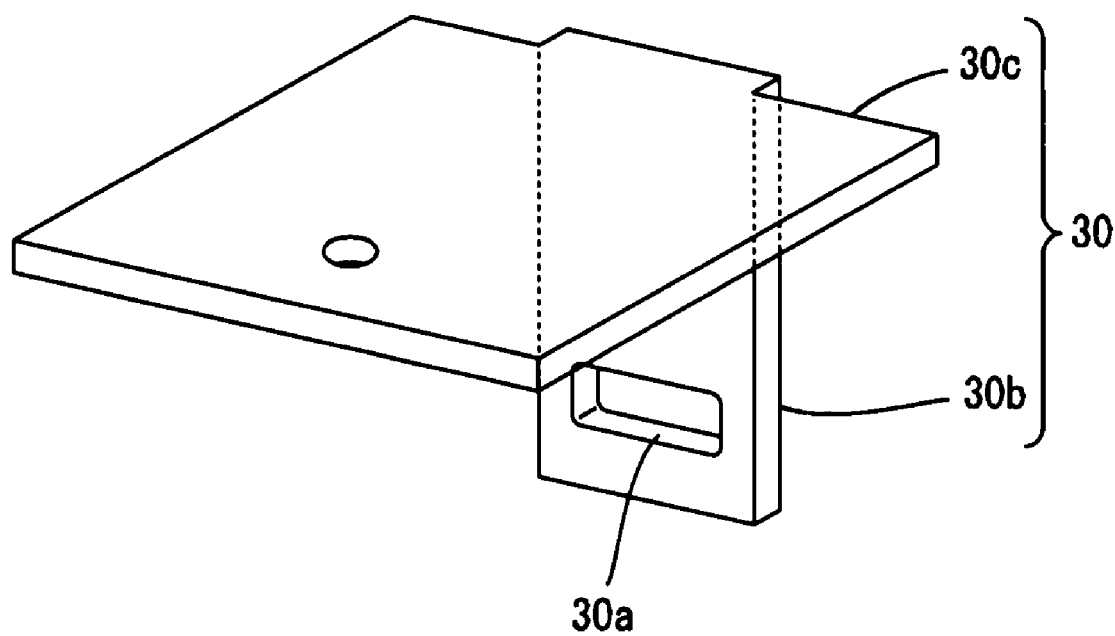
FIG. 3 is a schematic enlarged perspective view of a reinforcing bracket employed in the projector device of FIG. 1.

FIG. 2 is a schematic enlarged perspective view of the I/O case. FIG. 3 is a schematic enlarged perspective view of a reinforcing bracket. Referring to FIGS. 2 and 3, the I/O case 18 has a positioning section 18b provided on an inner surface thereof for positioning the reinforcing bracket 30 which serves to reinforce the first insertion slot 18a. The reinforcing bracket 30 comprises a vertically extending reinforcing-surface 30b and a horizontal extension surface 30c extending so as to be perpendicular to the vertically extending reinforcing-surface 30b, both of which have the same thickness. A second insertion slot 30a is formed in the vertically extending reinforcing-surface 30b. The lock shaft 1a of the lock mechanism 100 is to be inserted through the first and second insertion slots 18a, 30a, and engaged with an inner surface of the reinforcing surface 30b of the reinforcing bracket 30. In the illustrated example, the reinforcing bracket 30 is formed by utilizing a sheet-metal member having a thin thickness. Incidentally, as far as the reinforcing bracket 30 can reinforce the first insertion slot 18a of the I/O case 18, a material for the reinforcing bracket 30 is not limited to metal and can be suitably selected.

Figure 4:
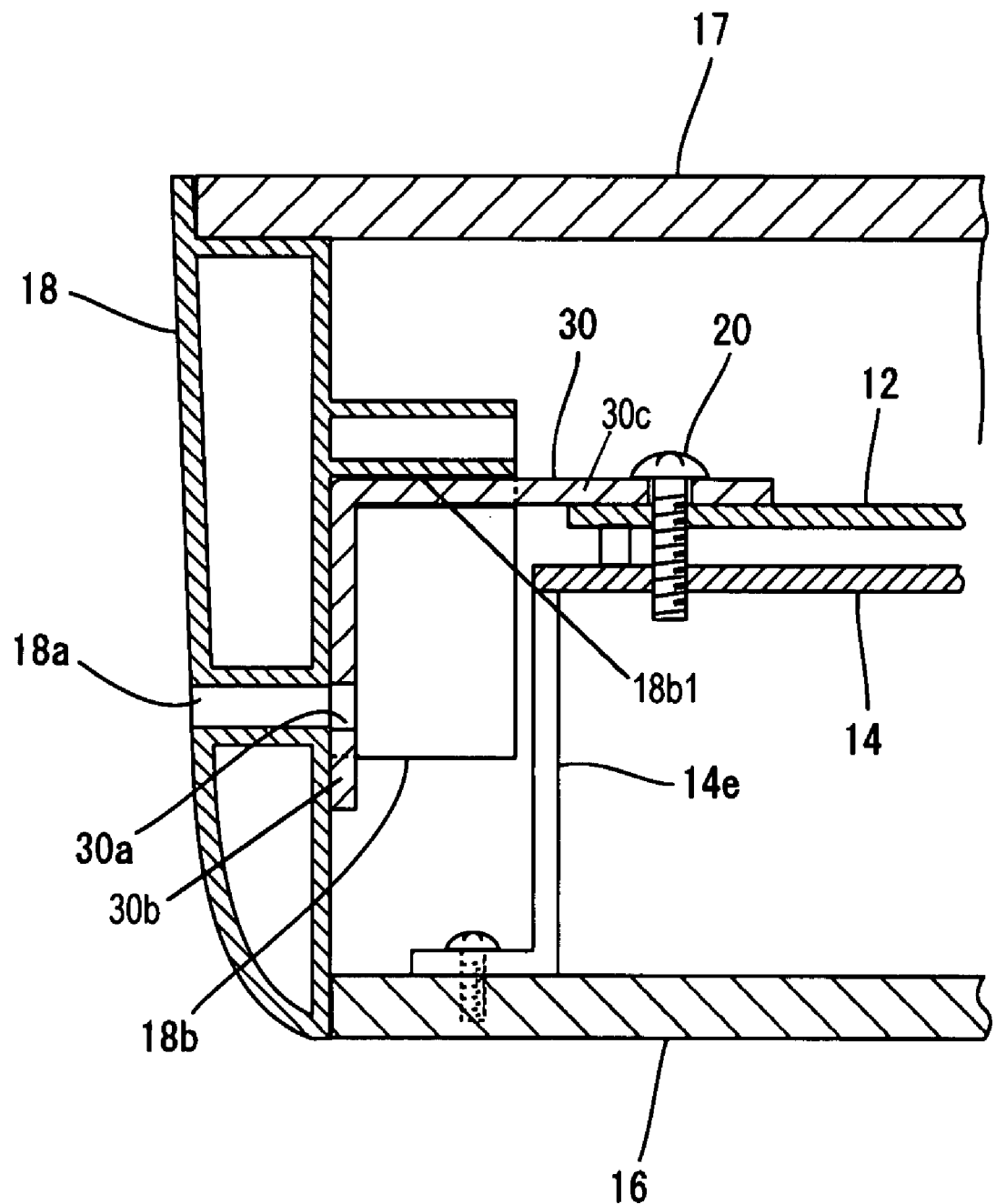
FIG. 4 is a schematic enlarged sectional view of a construction for fixing the reinforcing bracket, according to a first embodiment of the present invention.

As discussed above, the I/O case 18 have the positioning section 18b for positioning the reinforcing bracket 30. The positioning section 18b serves to restrict vertical and lateral movements of the reinforcing bracket 30. In the illustrated example, the positioning section 18b is provided on the inner surface of the I/O case 18 which faces an interior of the housing body 11, so as to stand up from the inner surface. The positioning section 18b has positioning slits 18b1 (only one slit 18b1 is shown in FIG. 4) formed therein for allowing the horizontal extension surface 30c of the reinforcing bracket 30 to be received by the positioning section 18b. When the horizontal extension surface 30c of the reinforcing bracket 30 is received by the positioning section 18b through the positioning slits 18b1, the second insertion slot 30a of the reinforcing surface 30b is aligned with the first insertion slot 18a of the I/O case 18 and the extension surface 30c is positioned with respect to the positioning section 18b with a forward portion thereof being projected forwardly from the positioning section 18b. In this way, the reinforcing bracket 30 is positioned with respect to the positioning section 18b of the I/O case 18 at a location at which the second insertion slot 30a is aligned with the first insertion slot 18a of the I/O case 18.

As shown in FIG. 2, the positioning section 18b comprises a pair of spaced apart members of substantially O-shapes in cross-section which are projected vertically from the I/O case 18. The substantially O-shaped members are spaced apart from each other at a distance slightly larger than a width of the reinforcing surface 30b of the reinforcing bracket, 30 so as to allow the first insertion slot 18a of the I/O case 18 to be interposed therebetween. Each of the substantially O-shaped members comprises a first substantially plate-shaped base portion 18b2, a second substantially plate-shaped base portion 18b3 extending downwardly from an outer end of the first base portion 18b2 so as to be perpendicular to the first base portion 18b2, a third substantially plate-shaped base portion 18b4 extending laterally from a lower end of the second base portion 18b3 so as to be perpendicular to the second base portion 18b3, and a fourth substantially plate-shaped base portion 18b5 extending toward an inner end of the first base portion 18b2 from an inner end of the third base portion 18b4 so as to be perpendicular to the third base portion 18b4. The inner end of the first base portion 18b2 and an upper end of the fourth base portion 18b5 are disconnected from each other, whereby one of the above-mentioned positioning-slit 18b1 is provided between the inner end of the first base portion 18b2 and the upper end of the fourth base portion 18b5. The positioning slit 18b1 has a depth substantially corresponding in size to a thickness of the horizontal extension surface 30c of the reinforcing bracket 30. A positioning slit 18b1 of one of the substantially O-shaped members and a positioning slit 18b 1 of the other of the substantially O-shaped members are aligned with each other. In the condition where the reinforcing bracket 30 is set to the positioning section 18b of the I/O case 18 with the horizontal extension surface 30c thereof being received by the substantially O-shaped members through the slits 18b1 and with the reinforcing surface 30b thereof being received in a space between the spaced apart substantially O-shaped members, the vertical movement of the horizontal extension surface 30c of the reinforcing bracket 30 is restricted by lower surfaces of the first base portions 18b2 and the upper ends of the fourth base portions 18b5, and the lateral movement of the horizontal extension surface 30c of the reinforcing bracket 30 is restricted by the second base portions 18b3.

Of course, the illustrated configuration of the positioning section 18b is merely one example for the positioning section which serves to restrict the vertical and lateral movements of the extension surface 30c of the reinforcing bracket 30. As far as a configuration for the positioning section 18b can realize the function of the positioning of the horizontal extension surface 30c of the reinforcing bracket 30 with respect to the positioning section 18b, it is not limited to the above-mentioned configuration. For example, in lieu of the above-mentioned substantially O-shaped members, a pair of spaced apart members of laterally faced U-shapes in cross-section may be symmetrically arranged so as to project vertically from the inner side surface of the I/O case 18, to thereby restrict the vertical and lateral movements of the horizontal extension surface 30c of the reinforcing bracket 30.

Referring now to FIG. 4, a process for fixing the reinforcing bracket 30 will be discussed hereinafter. FIG. 4 is a schematic enlarged sectional view of the reinforcing bracket 30 positioned by the positioning section 18b in the housing body. In the illustrated embodiment, the reinforcing bracket 30 positioned by the positioning section 18b of the I/O case 18 is fastened, at the horizontal extension surface 30c thereof, together with the control substrate 12 to the shield frame 14 by a screw 20 for fixing the control substrate 12 to the shield frame 14. By this, in addition to the vertical and lateral movements of the reinforcing bracket 30 being restricted by the positioning section 18b, forward and rearward movements of the reinforcing bracket 30 are restricted by the screw 20. Thus, the reinforcing bracket 30 is fixed at an appropriate location within the housing body 11. The extension surface 30c of the reinforcing bracket 30 is superposed on the control substrate 12 and can be then fastened together with the control substrate 12 to the shield frame 14 by using a threaded hole formed in the extension surface 30c, and the single screw 20. Therefore, it is possible to reduce the number of components, and reduce time required for fastening screws, to thereby increase the efficiency of assembling of the projector device.

Figure 5:
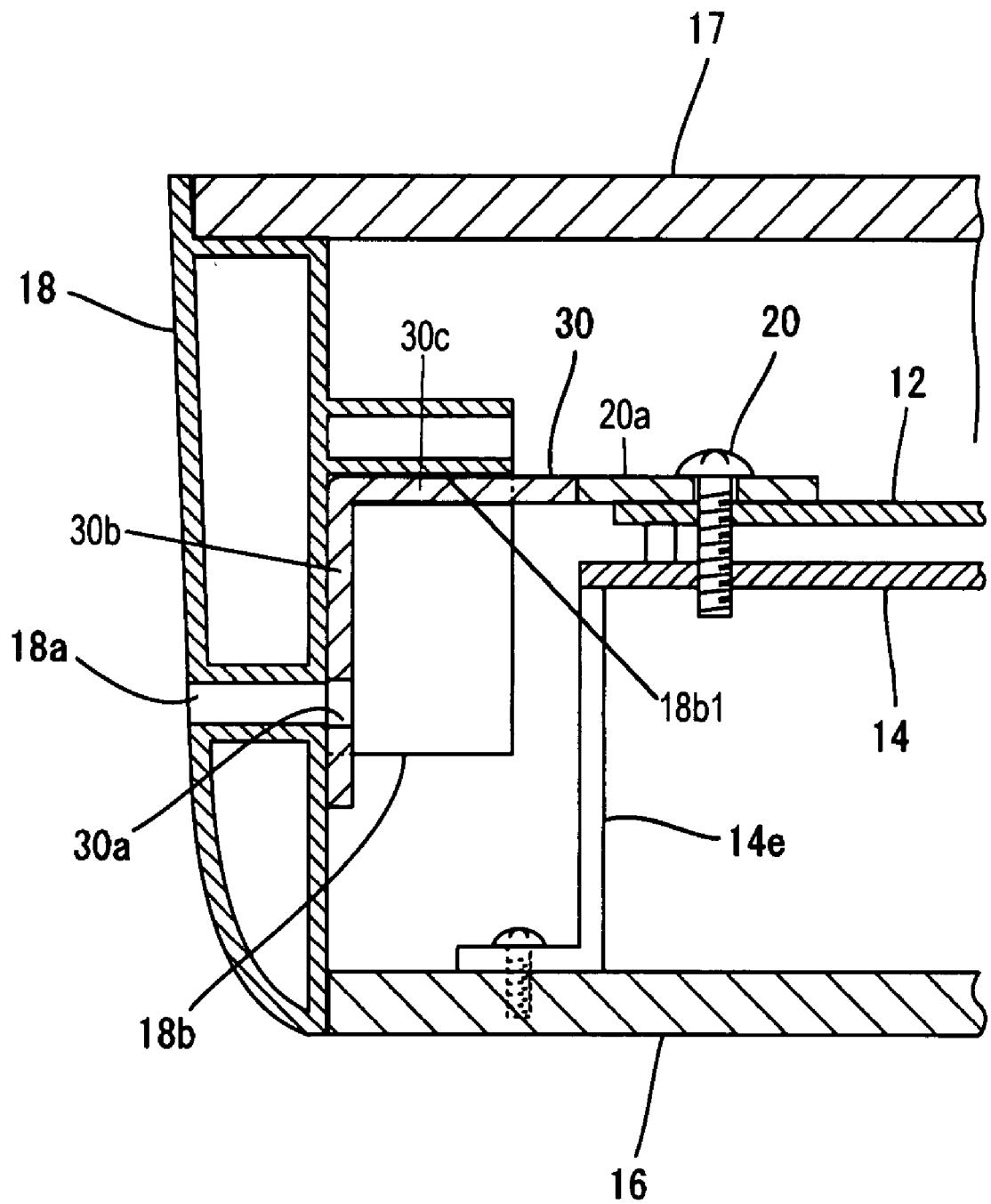
FIG. 5 is a schematic enlarged sectional view of a modification of the construction shown in FIG. 4.

In lieu of the structure shown in FIG. 4, a structure for fixing the reinforcing bracket 30 which is shown in FIG. 5 may be employed, to thereby restrict the forward and rearward movements of the reinforcing bracket 30. FIG. 5 is a schematic enlarged sectional view of a modification of the structure of FIG. 5 for fixing the reinforcing bracket 30. In the modification, the reinforcing bracket 30 is not fastened to the shield frame 14 but the forward and rearward movements of the reinforcing bracket 30 can be restricted by employing a different screw 20 for fastening the control substrate 12 to the shield frame 14, in lieu of the screw employed in the construction of FIG. 4. More particularly, a washer faced screw is employed as the different screw 20, the reinforcing bracket 30 per se is not fastened together with the control substrate 12 to the shield frame 14 by the washer faced screw 20, and the washer faced screw 20 fastens the control substrate 12 only to the shield frame 14 with a peripheral portion of a washer portion 20a thereof being abutted against an edge of the extension surface 30c of the reinforcing bracket 30, whereby the reinforcing bracket 30 is always pushed against the I/O case 18. Therefore, the forward and rearward movements of the reinforcing bracket 30 can be positively restricted in the same manner as in the construction shown in FIG. 4. Moreover, the reinforcing bracket 30 is always pushed against the I/O case 18 as discussed above, so that the construction of FIG. 5 can withstand such a force to pull the lock mechanism 100 (FIG. 7), which is applied to the lock mechanism 100. Incidentally, the screw 20 is not limited to the washer faced screw and, in lieu of the washer faced screw, a combination of a simple screw and a washer, a clip plate, a facing ring, an exclusive plate, or the like may be employed.

B. Effects Obtained by the First Embodiment

As discussed above, the reinforcing bracket 30 is positioned by the positioning section 18b of the I/O case 18 and fastened together with the control substrate 12 to the shield frame 14 by the screw 20. The shield frame 14 is made of metal, so that as compared to the resin-made I/O case 18, the shield frame 14 can withstand large stress. Therefore, it is possible to increase the fastening torque of the screw and provide a resistance to a large fastening torque as compared with the case where the reinforcing bracket 30 is screw-fastened to the I/O case 18. Moreover, the I/O case 18 per se is not required to resist the stress against the fastening torque of the screw 20, thus enabling free design of the shape of I/O case 18. In addition, an exclusive screw for fixing the reinforcing bracket 30 only is not required, thus making it possible to reduce the number of screws and production cost, and improve the efficiency of assembling of the projector device.

C. Second Embodiment

Figure 6:
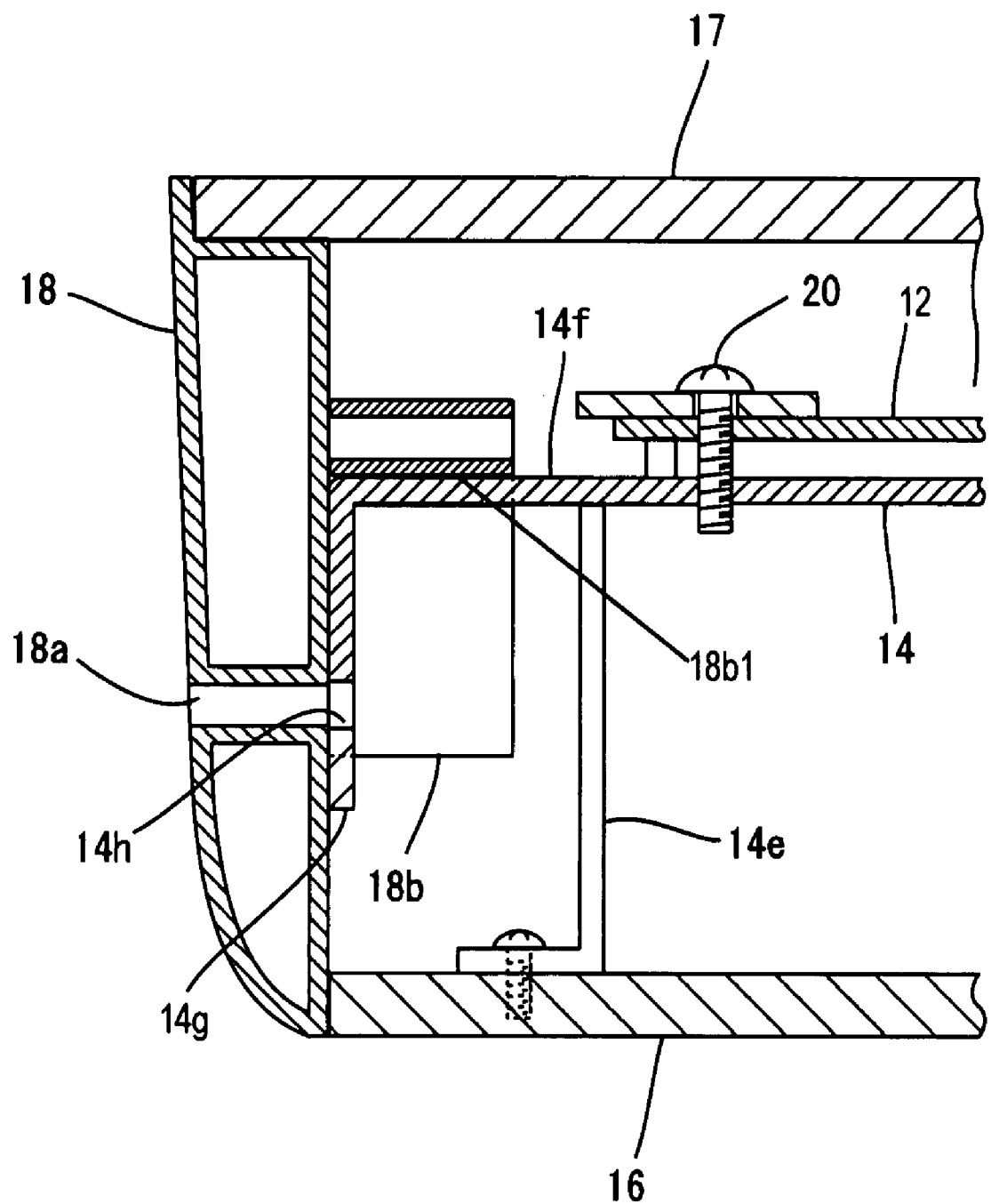
FIG. 6 is a schematic enlarged sectional view of a construction for fixing the reinforcing bracket, according to a second embodiment of the present invention.

A projector device according to a second embodiment of the present invention will be discussed hereinafter. In the projector device 10 according to the second embodiment, the reinforcing bracket 30 and the shield frame 14 are integrally formed as a one-piece member. FIG. 6 is a schematic enlarged sectional view of the projector device 10 according to the present invention. In the example shown in FIG. 6, an end portion of the shield case 14 is extended toward the I/O case 18, to thereby form an extension surface 14f, and an end portion of the extension surface 14f is extending downward so as to be perpendicular to the extension surface 14f, to thereby form a reinforcing surface 14g. Moreover, an insertion slot 14h through which the lock shaft 1a of the lock mechanism 100 (FIG. 7) is to be inserted is formed in the reinforcing surface 14g of the shield frame 14. The reinforcing surface 14g of the shield frame 14 functions in the same manner as the reinforcing surface 30b of the reinforcing bracket 30 of the first embodiment does.

The shield frame 14 is screw-fastened to the bottom case 16 with the extension surface 14f thereof being directed to the I/O case 18. Then, the top case 17 is combined with the bottom case 16, and the I/O case 18 is fixed to the combination of the top case 17 and the bottom case 16 so as to close the opening of the combination. At this time, the fixing of the I/O case 18 to the combination is carried out while allowing the positioning section 18b to receive the extension surface 14f of the shield frame 14 through the positioning slits 18b1 and allowing the space between the substantially O-shaped members of the positioning section 18b to receive the reinforcing surface 14g of the shield frame 14 in such a manner that the first insertion slot 18a of the I/O case 18 is aligned with the second insertion slot 14h of the reinforcing surface 14g. Incidentally, the positioning section 18b provided on the I/O case 18 of the projector device according to the second embodiment is constructed in the same manner as the positioning section of the first embodiment is done.

Moreover, even if the positioning section 18b is omitted from the I/O case 18, the same function as realized in the case where the I/O case 18 is provided with the positioning section 18b can be realized. In this case, it is desirable that the entire shield frame 14 is made so as to have an enough plate-thickness and the second insertion slot 14h formed in the reinforcing surface 14g is made slightly larger than the first insertion slot 18a of the I/O case 18. By this, it is possible to simplify the configuration of the I/O case 18, thus enabling further free design of the configuration of the I/O case 18. As one concrete example of the configuration of the I/O case 18, countless cooling slits may be formed in a front surface of the I/O case 18, thereby making it possible to enhance a cooling effect in the housing body. In the where the cooling slits are formed in the I/O case 18, the mechanical strength of the I/O case 18 will fall. However, the I/O case 18 per se is not required to withstand the fastening torque of the screw, so that even if the countless cooling slits are formed in the I/O case 18, the forming of the cooling slits in the I/O case 18 is not a problem.

D. Effects Obtained by the Second Embodiment

As discussed above, in the second embodiment according to the present invention, the free design of the housing body (I/O case 18) is enabled in the same manner as in the first embodiment, and the shield frame 14 has the reinforcing bracket formed integrally therewith, thus making it possible to increase the fastening torque of the screw 20 and improve the theft prevention effect. That is, the coupling of the projector device to the lock mechanism 100 (FIG. 7) is carried out by inserting the lock shaft of the lock mechanism 100 through the first and second insertion slots and then causing the lock shaft to be rotated, to thereby cause the projecting pieces 1a1 (FIG. 7) of the lock mechanism to be engaged with the reinforcing surface. Therefore, even if a thief tries to steal the projector device 10 by loosing screws for fastening the I/O case 18 and the bottom case 16 or the top case 17, and then disconnecting from the housing body the I/O case 18 to which the lock mechanism 100 is coupled, the projecting pieces of the lock mechanism 100 remains engaged with the reinforcing surface 14g of the shield frame 14, so that the thief can not disconnect the projector device 10 from the lock mechanism and steal the projector device 10. Thus, the second embodiment can also provide a theft prevention measure to the above-mentioned theft case, and enhance the theft prevention effect.

As discussed above in connection with the first embodiment, in order to reinforce the first insertion slot through which the lock shaft of the lock mechanism is to be inserted, the reinforcing bracket is positioned with respect to the inner surface of the housing body with the second insertion slot being aligned with the first insertion slot. The housing body is provided with the positioning means for positioning the reinforcing bracket. The reinforcing bracket is positioned by the positioning means in such a manner that the second insertion slot is aligned with the first insertion slot. After the reinforcing bracket is positioned by the positioning means, the extension surface of the reinforcing bracket is screw-fastened to the shield frame, whereby the reinforcing bracket is fixed in the housing body. The reinforcing bracket is screw-fastened to the metal-made shield frame, so that the housing body is not required to withstand the fastening torque of the screw. Moreover, the shield frame is made of metal, so that the shield frame can withstand an enough fastening torque of the screw. Therefore, according to the present invention, it is possible to provide a projector device in which the free design of a housing body is enabled and which allows the fastening torque of the screw for fixing the reinforcing bracket to be increased.

The reinforcing bracket is fastened together with the control substrate to the shield frame by the screw, thus making it possible to commonly use the screw for fastening the control substrate to the shield frame, in order to fix the reinforcing bracket. This enables the number of screws required for assembling of the projector device to be reduced.

Moreover, the screw may be the washer faced screw. The reinforcing bracket may be fixed with respect to the wall portion of the housing case on which the positioning means is provided, by causing the peripheral region of the washer portion of the washer faced screw to be pushed against the wall portion. That is, the washer faced screw is employed, and the reinforcing bracket is pushed against the I/O case, thus making it possible to provide a strong resistance to a force which is produced in such a direction to pull the lock mechanism.

Moreover, as discussed above in connection with the second embodiment, the shield frame is provided with the extension surface extending from the end of the arranging surface thereof, and the reinforcing surface extending vertically from the end of the extension surface so as to be perpendicular to the extension surface. The reinforcing surface has the second slot through which the lock shaft of the lock mechanism is to be inserted. The shield frame may be fixed to the housing body with the extension surface thereof being directed to the I/O case having the first insertion slot formed therein, and with the reinforcing surface being abutted against the I/O case in such a manner that the second insertion slot is aligned with the first insertion slot, whereby the first insertion slot is reinforced.

Therefore, in lieu of the reinforcing bracket, the shield frame can be employed in which the reinforcing surface for reinforcing the first insertion slot is formed by causing the end portion of the shield frame to be extended. Thus, the housing case and the shield frame become integral with each other while the lock shaft of the lock mechanism has been inserted through the first and second insertion slots and engaged with the projector device, so that the thief can not steal the projector device only by disassembling the housing body and disconnecting the lock mechanism from the projector device, and the theft prevention effect can be further increased.

It will be recognized by those skilled in the art that changes or modifications may be made to the above-described embodiments without departing from the broad inventive concepts of the present invention. It is understood, therefore, that the invention is not limited to the particular embodiments which are described, but is intended to cover all modifications and changes within the scope and spirit of the invention as described above and set forth in the appended claimed.

Although the invention has been described in considerable detail in language specific to structural features or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, the inductors can be hollow tubular coils. Such variations and alternate embodiments are contemplated, and can be made without departing from the spirit and scope of the invention.

It is to be understood that the phraseology and terminology employed herein, as well as the abstract, are for the purpose of description and should not be regarded as limiting.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A projector device comprising:

an optical system including a lamp and a projector lens;

the optical system producing an RGB light image on a basis of light from the lamp and projecting the RGB light image through the projector lens;

a control substrate for controlling the optical system;

a power source substrate for supplying power;

a shield frame including an arranging surface on which the control substrate is arranged, and leg portions extending vertically from end portions of the arranging surface;

a housing body for housing the optical system, the control substrate, the power source substrate, and the shield frame;

the housing body including a bottom case, a top case, an input/output (I/O) case, and a front portion;

the bottom case including a bottom surface having a forward portion and a rearward portion, and a front wall provided at an edge of the forward portion to vertically stand up from the bottom surface;

the front wall forming the front portion of the housing body;

the power source substrate being arranged on the rearward portion of the bottom surface;

the optical system being arranged on the forward portion of the bottom surface with an image projecting side of the projector lens exposed to outside through the front portion of the housing body;

the shield frame fastened onto the bottom surface of the bottom case to cover the power source substrate on the bottom surface;

the top case having a U-shape in cross-section and including a ceiling surface and side walls provided at both sides of the ceiling surface so as to extend vertically from the both sides of the ceiling surface;

the top case is combined with the bottom case;

the I/O case including a substantially rectangle-shaped body that has a circular arc-shape in cross-section, and a first elongated insertion slot formed in the substantially rectangle-shaped body;

the I/O case is fixed to a combination of the top case and the bottom case to close a rear opening of the combination that is opposed to the front portion of the housing body;

a reinforcing bracket for reinforcing a mechanical strength of the first elongated insertion slot;

a positioning section provided on an inner surface of the input/output (I/O) case for positioning the reinforcing bracket;

the positioning section having positioning slits;

the reinforcing bracket including a reinforcing surface and an extension surface extending perpendicularly to the reinforcing surface;

the reinforcing surface having a second elongated insertion slot;

the reinforcing bracket supported and positioned by the positioning section with the extension surface received in the positioning section through the positioning slits of the positioning section to partially project forward from the positioning section, and with the reinforcing surface superposed on an inner surface of the input/output (I/O) case in such a manner that the second elongated insertion slot is aligned with the first elongated insertion slot of the I/O case, so that a mechanical strength of the first elongated insertion slot is reinforced by the reinforcing surface;

a fastener for fastening the extension surface of the reinforcing bracket together with the control surface to the shield frame; and the extension surface of the reinforcing bracket is fastened, at a forwardly projecting portion thereof, together with the control substrate to the shield frame by the fastener; with the projector device coupled to a lock mechanism for preventing the projector device from being removed, the lock mechanism including a lock shaft that is to inserted through the first and second elongated insertion slots and is engaged with the projector device.

2. A projector device, comprising:

a housing body having a first insertion slot formed in a wall portion thereof;

a control substrate;

a metal shield frame arranged within the housing body and fixed to the housing body for allowing the control substrate arranged at a predetermined location in the housing body;

a reinforcing bracket for reinforcing the first insertion slot;

the reinforcing bracket including a reinforcing surface and an extension surface, with the extension surface extending perpendicular to the reinforcing surface;

the reinforcing surface having a second insertion slot;

a positioning section provided on an inner surface of the wall portion of the housing body for positioning the reinforcing bracket with respect to the housing body with the second insertion slot of the reinforcing bracket aligned with the first insertion slot; and a fastener for coupling the extension surface of the reinforcing bracket positioned by the positioning section to the shield frame, and wherein the reinforcing bracket is fastened, at the extension surface thereof, together with the control substrate to the shield frame by the fastener.

3. The projector device as set forth in claim 2, wherein the fastener is a washer faced screw provided with a washer portion, a peripheral region whose is adapted to be abutted against the extension surface of the reinforcing bracket and push the reinforcing bracket against the wall portion of the housing body on which the positioning section is provided.

* * * * *